June 2, 1936.                E. A. HALL                2,042,783
ADJUSTING MEANS FOR SLEEVE BEARINGS
Filed Sept. 1, 1934
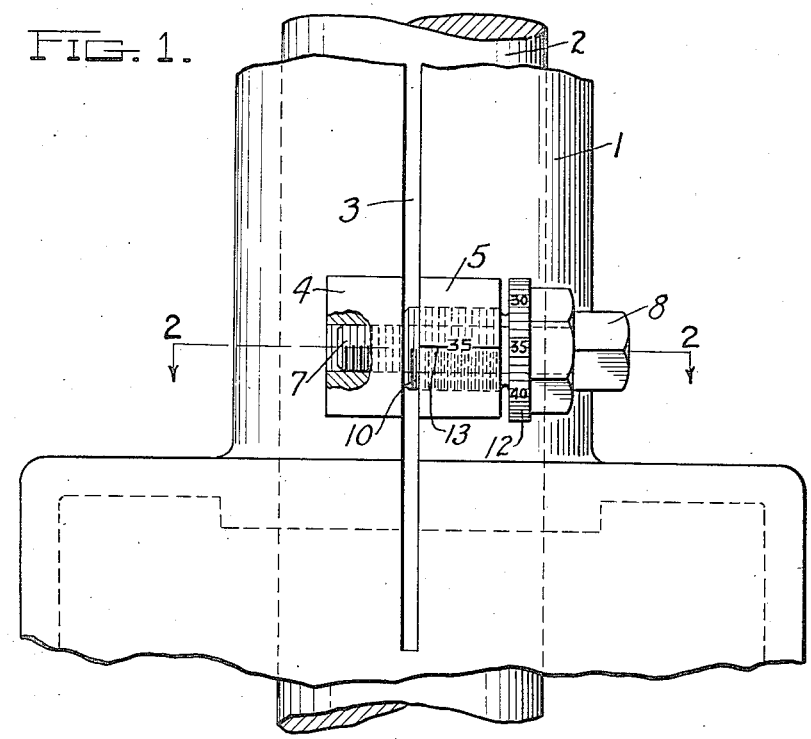
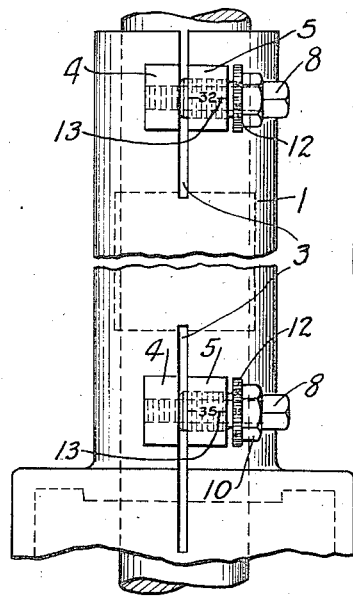
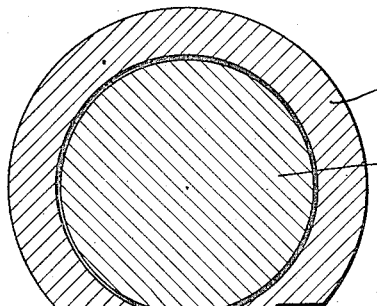
Inventor
Ernest A. Hall
By Owen & Owen
Attorney Patented June 2, 1936

2,042,783

UNITED STATES PATENT OFFICE 2,042,783

ADJUSTING MEANS FOR SLEEVE BEARINGS

Ernest A. Hall, Toledo, Ohio, assignor to The Hall Manufacturing Company, Toledo, Ohio, a corporation of Ohio Application September 1, 1934, Serial No. 742,421

2 Claims. (Cl. 308—65)

This invention relates to an adjustment for sleeve bearings and is particularly directed to a take-up device having a micrometer scale in conjunction therewith.

In adjusting the main sleeve bearing of a cylinder boring bar or similar precision device in which the accuracy of adjustment largely determines the character of the work done by the machine, it is necessary to provide means to accurately set the bearing and to retain it in adjusted position. It has been found that the average mechanic does not adjust the bearing properly when wear occurs with the result that the temperature of the machine runs excessively high, or that the adjusted position is actually looser than before because of the "hit or miss" manner in which the operation was performed. The reason for these errors lies largely in the fact that the mechanic has previously been provided with no standard from which to work, nor did he know how much he had moved the bearing one way or the other.

The present invention has for its primary object to overcome the disadvantages of imperfect bearing adjustment.

Another object of the invention is to provide a device which enables the user to determine accurately what change in adjustment he has made from the initial factory setting.

Still another object is to provide means to retain the parts in adjusted position.

Other objects and advantages of the invention will become apparent as the description proceeds, reference being had to the accompanying drawing in which:

Figure 1 is a fragmentary side view with parts in section of a sleeve bearing take-up embodying the present invention; Fig. 2 is a section on line 2—2 of Figure 1 with a part broken away, and Fig. 3 is a fragmentary side elevation of the device as used on a long sleeve bearing.

Referring to the drawing, the present invention is shown in use with a sleeve bearing 1 in which a shaft 2 is adapted to rotate. Obviously the shaft may be part of the driving mechanism of any precision machine in which accurate bearing setting is highly important.

The sleeve bearing 1 is slotted at each end as at 3 so that its internal dimensions may be varied to accommodate changed dimensions in the shaft 2 due to wear or other causes. The bearing is preferably provided with opposed protruding shoulders 4 and 5 on each side of the slot for a purpose which will presently become apparent.

The adjusting mechanism includes a cap screw 7 having a head 8 and which is in threaded engagement with the shoulder 4 of the bearing. The cap screw is preferably inserted through the central portion of a tubular micrometer screw 10 which is threaded into the shoulder 5 and is adapted to extend across the slot 3 into abutting engagement with the shoulder 4. The head of the micrometer screw is provided with a scale 12 which is graduated in terms of bearing circumference or any other suitable unit and which is adapted to be read in connection with a reference line 13 on the adjacent shoulder 5.

When the tool is assembled at the factory the sleeve bearing is adjusted by highly skilled mechanics until the most desirable setting is obtained. The reading given by the scale 12 at this adjustment of the bearing is then marked on the shoulder adjacent the reference line 13. This point then determines the standard from which future adjustments are made.

In operation, if the bearing has worn slightly so that the mechanic desires to tighten it, the cap screw 7 is backed out or loosened very slightly. If the factory setting of the bearing was at "35" the micrometer screw will be turned to "34" and the cap screw will then be tightened again so as to bring the wall of the slot 3 tight against the nose of the micrometer screw. This adjustment has changed the circumferential dimension of the bearing .001 inch. This should be sufficient to take up whatever wear has occurred.

If the new adjustment, or setting is too tight, it may be necessary to move it back .0005 from its new position. To accomplish this, the cap screw 8 is loosened, the micrometer screw is moved so that the reference line is half way between "34" and "35". The cap screw is tightened down to maintain the setting and the bearing is adjusted.

As will be seen from Fig. 3, it is advantageous to duplicate the adjusting mechanism at intervals along the length of the bearing if the bearing surface is long or if there are two spaced bearing points. By this means the accuracy of setting is increased.

It will be appreciated that the present invention enables a mechanic in the field to know exactly what he is doing whenever he is called upon to make a bearing adjustment. Further, he is informed as to the original setting so that he can never be far from his correct position. Thus, all guess work is eliminated, as is also the tendency to make adjustments from the sense of touch alone.

Obviously various modifications and changes may be made in the form and disposition of the parts without departing from the spirit of the invention as defined in the appended claims.

What I claim is:

1. In a device for adjusting the circumferential dimension of a sleeve bearing having a longitudinal slot, shoulders carried by said bearing at opposite sides of said slot, a tubular micrometer screw threadedly engaged with one of said shoulders and having its nose abutting the other of said shoulders, said micrometer screw having a calibrated cylindrical projection adjacent its head, a reference line carried by said first shoulder adjacent said micrometer screw, and a cap screw extending through said micrometer screw and threadedly engaged with said second shoulder whereby said shoulder is drawn into engagement with said micrometer screw.

2. In a device for adjusting the circumferential dimension of a sleeve bearing having a slot, shoulders carried by said bearing at opposite sides of said slot, a tubular micrometer screw threadedly engaged with one of said shoulders and having its nose abutting the other of said shoulders, said micrometer screw having a calibrated cylindrical projection adjacent its head, a reference line on one of said shoulders for use with said micrometer screw, and means extending through said micrometer screw to draw the second of said shoulders against the nose of said micrometer screw.

ERNEST A. HALL.